US010500871B2

(12) United States Patent
Kurihara (10) Patent No.: US 10,500,871 B2
(45) Date of Patent: Dec. 10, 2019

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Takayuki Kurihara, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/090,393

(22) PCT Filed: Feb. 28, 2017

(86) PCT No.: PCT/JP2017/008031
§ 371 (c)(1),
(2) Date: Oct. 1, 2018

(87) PCT Pub. No.: WO2017/179330
PCT Pub. Date: Oct. 19, 2017

(65) Prior Publication Data
US 2019/0111706 A1    Apr. 18, 2019

(30) Foreign Application Priority Data

Apr. 14, 2016 (JP) .................................. 2016-081532

(51) Int. Cl.
| | | |
|---|---|---|
| B41J 2/47 | (2006.01) | |
| G02B 26/12 | (2006.01) | |
| H04N 1/113 | (2006.01) | |

(52) U.S. Cl.
CPC ................ *B41J 2/47* (2013.01); *G02B 26/12* (2013.01); *G02B 26/121* (2013.01); *H04N 1/113* (2013.01)

(58) Field of Classification Search
CPC ........... B41J 2/471; B41J 2/47; G02B 26/121; G02B 26/12; G02B 26/125; G02B 26/124;
(Continued)

(56) References Cited

U.S. PATENT DOCUMENTS

| | | | | |
|---|---|---|---|---|
| 4,515,261 A | * | 5/1985 | Prisant ...................... | G07F 9/10 194/350 |
| 7,760,228 B2 | * | 7/2010 | Mamiya ................... | B41J 2/473 347/242 |

(Continued)

FOREIGN PATENT DOCUMENTS

| | | |
|---|---|---|
| JP | 9-5661 | 1/1997 |
| JP | 2010-237432 | 10/2010 |

(Continued)

OTHER PUBLICATIONS

International Search Report dated May 23, 2017 in corresponding International Application No. PCT/JP2017/008031.

*Primary Examiner* — John Zimmermann
(74) *Attorney, Agent, or Firm* — Wenderoth, Lind & Ponack, L.L.P.

(57) ABSTRACT

An optical scanning device includes a housing having first projecting bosses (46a) to (46d) and second projecting bosses (48a) to (48d) which are able to fix a first driving substrate (331) and a second driving substrate (332), respectively. The second projecting bosses (48a) to (48d) are arranged inward from the first projecting bosses (46a) to (46d) in a predetermined direction, the second substrate (332) is formed so as not to overlap the first projecting bosses (46a) to (46d) when viewed from a height direction of the second projecting bosses (48a) to (48d) in a state of being fixed to the second projecting bosses (48a) to (48d), and heights of the second projecting bosses (48a) to (48d)

(Continued)

are lower than those of the first projecting bosses (46*a*) to (46*d*).

3 Claims, 12 Drawing Sheets

(58) Field of Classification Search
CPC ......... G03G 15/04036; G03G 21/1666; H04N 1/024
See application file for complete search history.

(56) References Cited

U.S. PATENT DOCUMENTS

| | | | | |
|---|---|---|---|---|
| 8,174,747 B2* | 5/2012 | Amada | ................... | B41J 2/471 |
| | | | | 347/242 |
| 8,619,108 B2* | 12/2013 | Ishidate | ................... | B41J 2/471 |
| | | | | 347/242 |
| 10,325,188 B2* | 6/2019 | Shirai | ................. | G03G 15/043 |
| 2005/0046733 A1 | 3/2005 | Bang | | |
| 2013/0293659 A1 | 11/2013 | Suzuki et al. | | |
| 2018/0051492 A1* | 2/2018 | Smith | ....................... | B60J 5/04 |

FOREIGN PATENT DOCUMENTS

| | | |
|---|---|---|
| JP | 2013-113982 | 6/2013 |
| JP | 2013-231903 | 11/2013 |

\* cited by examiner

OPTICAL SCANNING DEVICE AND IMAGE FORMING APPARATUS INCLUDING THE SAME

TECHNICAL FIELD

The present invention relates to an optical scanning device and an image forming apparatus including the same.

BACKGROUND ART

In the related art, as an optical scanning device installed in an electrophotographic image forming apparatus, an optical scanning device using a polygon mirror has been known (for example, see Patent Literature 1). In this optical scanning device, light emitted from a light source is reflected from a peripheral surface of a rotating polygon mirror and is scanned in a predetermined direction. The optical scanning device includes a polygon motor for rotating the polygon mirror, a driving substrate, and a housing for receiving these elements in addition to the polygon mirror.

The polygon motor is supported to the driving substrate and the driving substrate is fixed to a bottom wall part of the housing. In the driving substrate, electronic parts such as a connector and a driving IC are mounted.

The driving substrate is formed with a plurality of mounting holes, and the bottom wall part of the housing is formed with mounting target holes at positions corresponding to the mounting holes. The mounting target holes are coaxially formed with respect to a plurality of projecting bosses that project from the bottom wall part of the housing. The driving substrate is fixed by a coupling member passing through each mounting hole and each mounting target hole in a state of being supported to the plurality of projecting bosses.

In the image forming apparatus, there are cases where, in order to satisfy a wide range of user demands, a plurality of models having different processing speeds (that is, the number of sheets printable per unit time) are set. In order to change the processing speeds, it is necessary to change the rotating speed of the polygon motor. However, the possible number of rotations of the polygon motor is limited by performance and the like of a bearing. Therefore, the type of the polygon motor to be installed in an optical scanning device needs to differ in a low speed model and a high speed model.

However, when the type of the polygon motor is different, since a maker that manufactures the polygon motor is different, the arrangement configuration of the mounting holes of the driving substrate may also be different. In this case, when different housings are prepared for a plurality of substrates having different arrangement configurations of the mounting holes, the manufacturing cost may increase. In this regard, for example, in an optical scanning device disclosed in Patent Literature 1, a bottom wall part of a housing is formed with first mounting target holes for mounting a first substrate and second mounting target holes for mounting a second substrate having an arrangement configuration of mounting holes different from that of the first substrate. The first mounting target holes and the second mounting target holes are formed in first projecting bosses and second projecting bosses that project from the bottom wall part of the housing. Heights of the first projecting bosses and heights of the second projecting bosses are set to be identical to each other.

CITATION LIST

Patent Literature

Patent Literature 1: Japanese Unexamined Patent Application Publication No. 2013-113982

SUMMARY OF INVENTION

Technical Problem

In the optical scanning device disclosed in the Patent Literature 1, if the molding accuracy of each projecting boss is low, when the first substrate is fixed to the first projecting bosses for example, there is a problem that the first substrate rides up to upper sides of the second projecting bosses and is inclined. In order to avoid this problem, it is necessary to precisely manage the height of each projecting boss. However, when the first projecting bosses and the second projecting bosses are provided in the housing as described above, the molding accuracy required for each projecting boss becomes high as compared with a case where only the first projecting bosses are formed in the housing (that is, a case where only one type of substrate can be fixed to the housing). That is, when the first projecting bosses and the second projecting bosses are formed in the housing, since it is necessary to perform height adjustment of the first projecting bosses and the second projecting bosses as well as the height adjustment of the first projecting bosses, the molding accuracy required for each projecting boss becomes inevitably high. As a consequence, there is a problem that hosing molding cost increases.

The present invention has been made to solve the aforementioned problems, and an object of the present invention is to suppress molding accuracy required for first projecting bosses and second projecting bosses to be low as much as possible and to reduce the molding cost of a housing in an optical scanning device including the housing having the first projecting bosses and the second projecting bosses and an image forming apparatus, a first substrate and a second substrate being respectively fixed to the first projecting bosses and the second projecting bosses.

Solution to Problem

An optical scanning device according to the present invention includes a housing having a mounting target wall part on which any one of a first substrate and a second substrate is selectively mountable, the first substrate having a plurality of mounting holes, the second substrate having an arrangement configuration of mounting holes different from that of the mounting holes of the first substrate, first projecting bosses and second projecting bosses projecting from the mounting target wall part, the first projecting bosses having first mounting target holes provided at positions corresponding to the mounting holes of the first substrate, the second projecting bosses having second mounting target holes provided at positions corresponding to the mounting holes of the second substrate.

The second projecting bosses are arranged inward from the first projecting bosses in a predetermined direction, the second substrate is formed so as not to overlap the first projecting bosses when viewed from a height direction of the second projecting bosses in a state of being fixed to the second projecting bosses, and heights of the second projecting bosses are set to be lower than heights of the first projecting bosses.

Advantageous Effects of Invention

According to the present invention, in an optical scanning device including a housing having first projecting bosses and second projecting bosses to which a first substrate and a second substrate are respectively fixed, and an image forming apparatus, it is possible to suppress molding accuracy required for the projecting bosses to be low as much as possible and to reduce the molding cost of the housing.

DESCRIPTION OF EMBODIMENTS

Hereinafter, embodiments of the present invention will be described in detail on the basis of the drawings. It is noted that the present invention is not limited to the following embodiments.

<Image Forming Apparatus>

Figure 1:
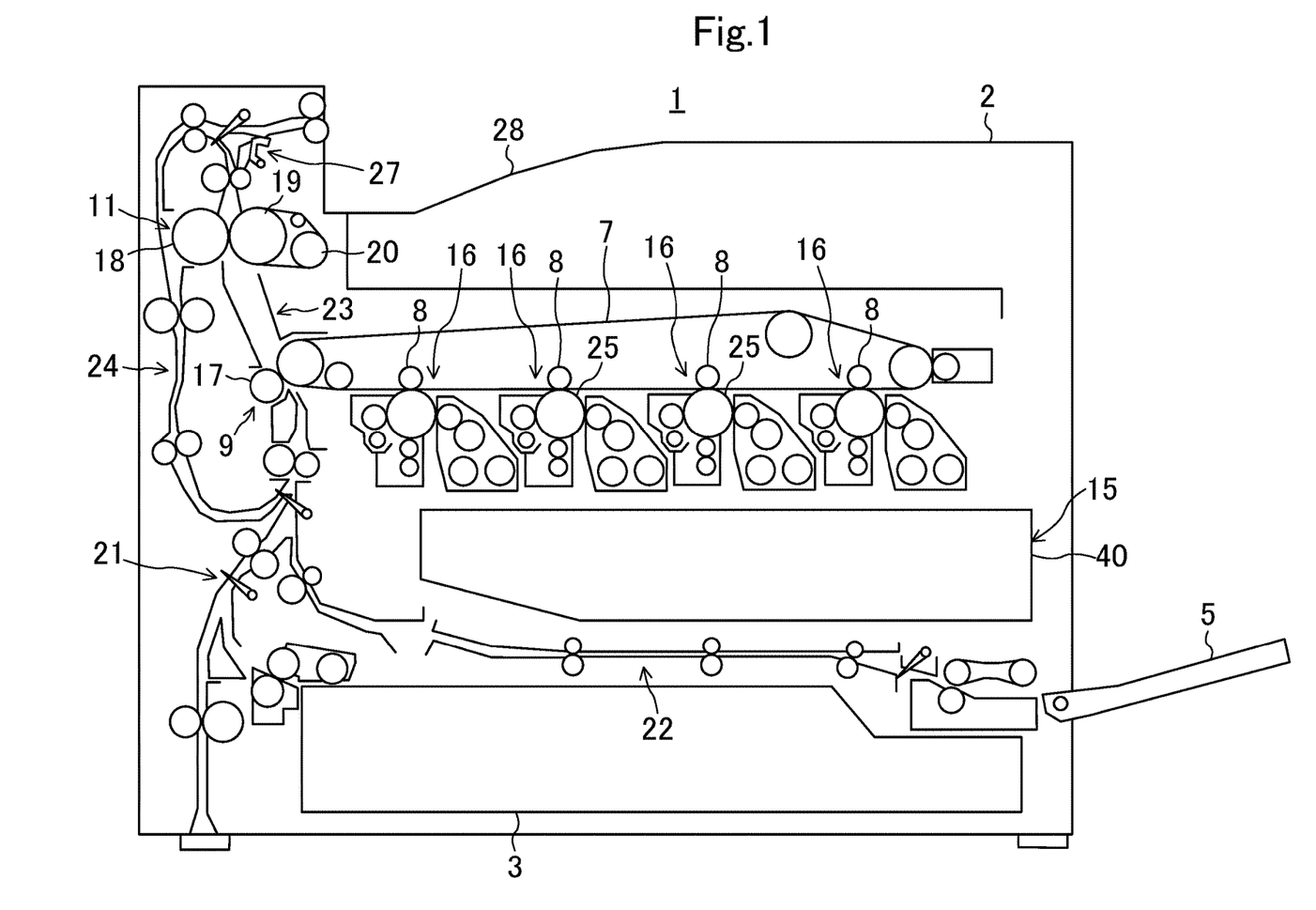
FIG. 1 is a schematic configuration diagram illustrating an image forming apparatus including an optical scanning device in an embodiment.

FIG. 1 is a sectional view illustrating a schematic structure of an image forming apparatus 1. The image forming apparatus 1, for example, is a tandem type color printer and includes an intermediate transfer belt 7, a primary transfer unit 8, a secondary transfer unit 9, a fixing unit 11, an optical scanning device 15, and a plurality of image forming units 16 as illustrated in FIG. 1.

At an internal lower part of a body 2 of the image forming apparatus 1, a sheet feeding cassette 3 is disposed. The sheet feeding cassette 3 receives non-printed stacked sheets (not illustrated) therein. At a lateral side of the sheet feeding cassette 3, a first sheet conveying unit 21 is provided. The first sheet conveying unit 21 receives sheets sent from the sheet feeding cassette 3, and conveys the sheets to the secondary transfer unit 9 disposed above.

At a right side of the sheet feeding cassette 3, a manual sheet feeding unit 5 is provided. At a left side of the manual sheet feeding unit 5, a second sheet conveying unit 22 is provided. The second sheet conveying unit 22 receives sheets and the like sent from the manual sheet feeding unit 5, and conveys the sheets and the like to the first sheet conveying unit 21.

The optical scanning device 15 is disposed above the second sheet conveying unit 22, and irradiates laser beams to the image forming units 16 on the basis of image data received in the image forming apparatus 1. For example, four image forming units 16 are provided above the optical scanning device 15. Above each image forming unit 16, an endless intermediate transfer belt 7 is provided. The intermediate transfer belt 7 is wound around a plurality of rollers, and rotationally driven by a driving device (not illustrated).

As illustrated in FIG. 1, the four image forming units 16 are disposed in a row along the intermediate transfer belt 7, and form yellow, magenta, cyan, and black toner images, respectively. That is, in each of the image forming units 16, an electrostatic image of a document image is formed on a photosensitive drum 25 by the laser beams irradiated by the optical scanning device 15, and is developed, so that a tone image of each color is formed.

The primary transfer unit 8 is disposed above each of the image forming units 16. The primary transfer unit 8 has a transfer roller that primarily transfers the toner image formed by the image forming unit 16 to the surface of the intermediate transfer belt 7.

Together with the rotational driving of the intermediate transfer belt 7, the toner image of each of the image forming units 16 is transferred to the intermediate transfer belt 7 at a predetermined timing, so that a color toner image, in which toner images of four colors (yellow, magenta, cyan, and black) are superposed on one another, is formed on the surface of the intermediate transfer belt 7.

As illustrated in FIG. 1, the secondary transfer unit 9 has a transfer roller 17 disposed at a left side of the intermediate transfer belt 7. The secondary transfer unit 9 is configured to apply a transfer bias voltage having a polarity opposite to that of toner to a sheet sent from the first sheet conveying unit 21, thereby transferring the toner images on the sheet from the intermediate transfer belt 7.

The fixing unit 11 is provided above the secondary transfer unit 9. Between the secondary transfer unit 9 and the fixing unit 11, a third sheet conveying unit 23 is formed to convey the sheet with the secondarily transferred toner images to the fixing unit 11. The fixing unit 11 includes a pressure roller 18, a fixing roller 19, and a heating roller 20. Furthermore, the fixing unit 11 is configured to heat and press the sheet conveyed from the third sheet conveying unit 23, thereby fixing the toner images to the sheet.

A branch part 27 is provided above the fixing unit 11. The sheet discharged from the fixing unit 11 is discharged from the branch part 27 to a sheet discharge unit 28 formed at an upper part of the image forming apparatus 1 when duplex printing is not performed. When the duplex printing is performed, the sheet is conveyed again from the branch part 27 to the secondary transfer unit 9 via a fourth sheet conveying unit 24.

<Optical Scanning Device>

Figure 2:
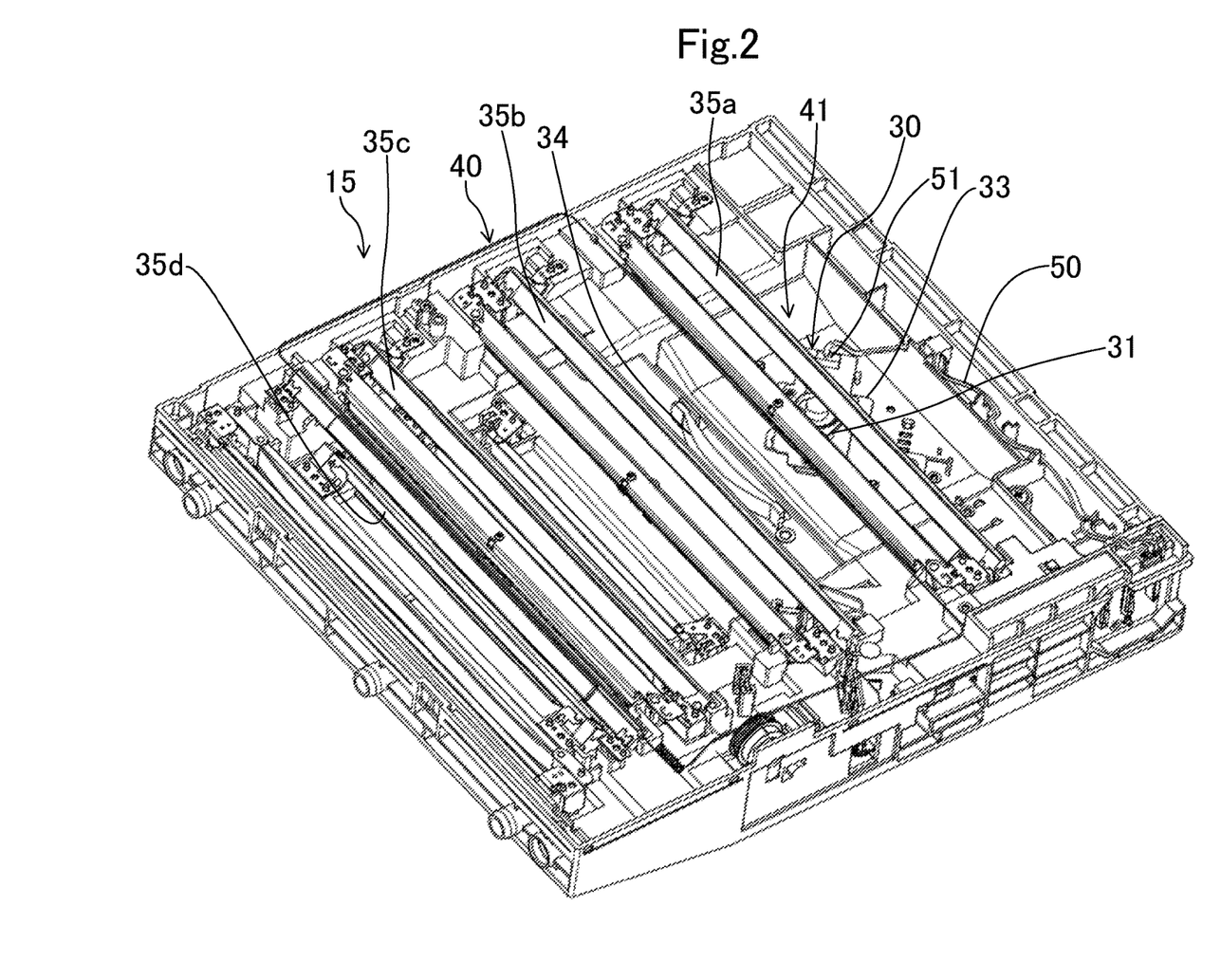
FIG. 2 is a perspective view illustrating an optical scanning device in an embodiment.
Figure 3:
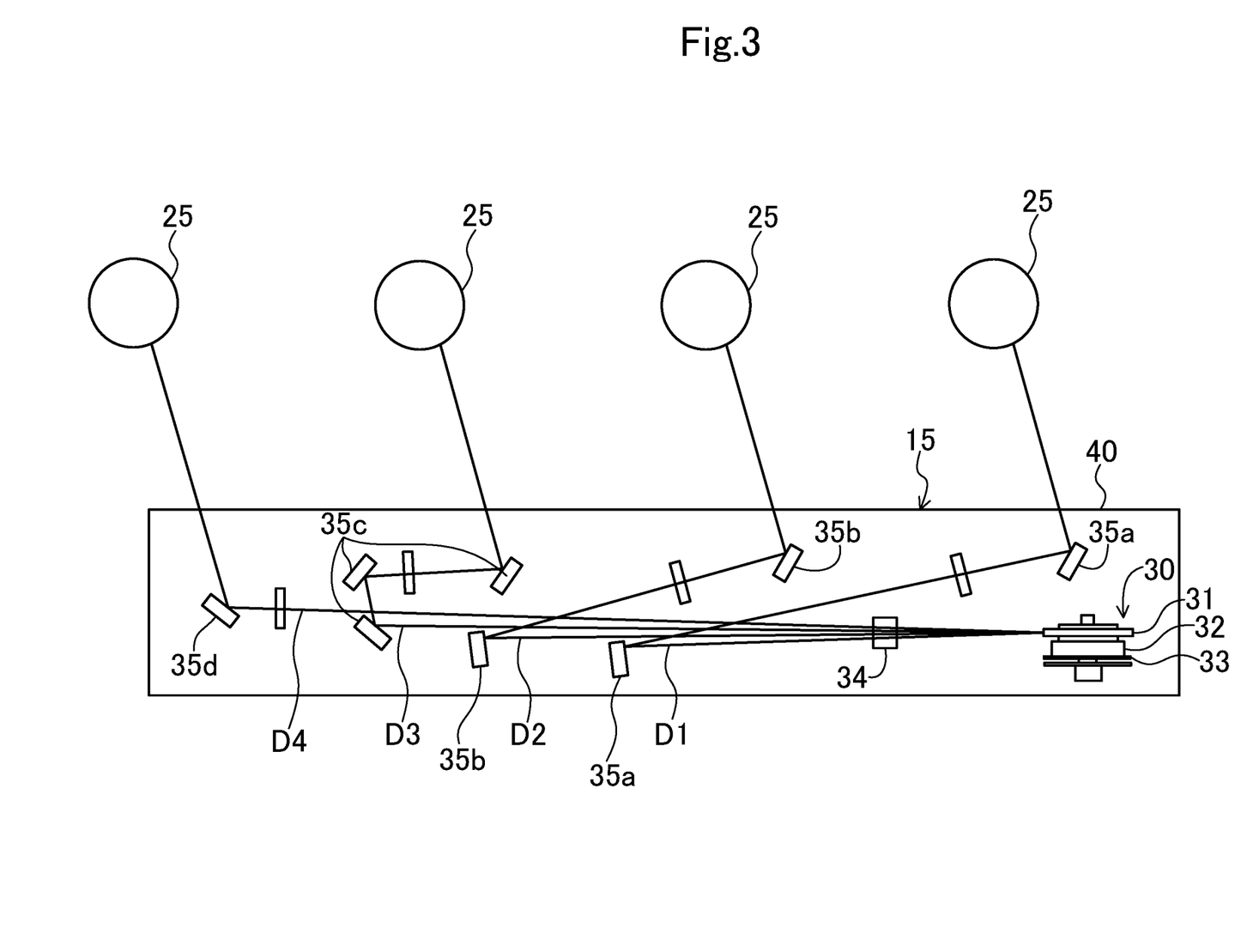
FIG. 3 is a longitudinal sectional view illustrating a schematic internal configuration of an optical scanning device.

As illustrated in FIG. 2 and FIG. 3, the optical scanning device 15 includes a plurality of light sources (not illustrated), a deflector 30 that deflects and scans laser beams emitted from the plurality of light sources, and a housing 40 that receives the deflector 30. The housing 40 is configured with a rectangular box-like housing body opened upward and a lid (not illustrated) that opens and closes an upper side of the housing body. The housing 40 is disposed in which its longitudinal direction coincides with the right and left direction (the right and left direction of FIG. 1) of the image forming apparatus. The housing 40 is provided at one side end part in the longitudinal direction (the right and left direction of the image forming apparatus) thereof with a deflector receiving unit 41 that receives the deflector 30.

The plurality of light sources are configured by a laser diode and are mounted at and fixed to a sidewall part of the deflector receiving unit 41. The total number of light sources is 4 in correspondence to the number of reference colors (four of yellow, magenta, cyan, and black in the present embodiment) used in the image forming apparatus 1.

The deflector 30 has a polygon mirror 31, a polygon motor 32, and a driving substrate 33. The polygon mirror 31 is fixed to a rotating shaft of the polygon motor 32, the polygon motor 32 is fixed to the driving substrate 33, and the driving substrate 33 is mounted at and fixed to a bottom wall part 42 of the deflector receiving unit 41 of the housing 40.

The polygon mirror 31, for example, is a rotating polygon mirror having a polygonal shape (a hexagonal shape in the present embodiment) and is rotationally driven by the polygon motor 32. An operation of the polygon motor 32 is controlled by a driving IC 37 (see FIG. 4 and FIG. 5) mounted in the driving substrate 33. The driving substrate 33 is mounted with an electric connector 36 for power supply and the like in addition to the driving IC 37.

In the housing 40, the deflector receiving unit 41 is provided at the lateral side thereof with an image forming lens (for example, an fθ lens in the present embodiment) 34 through which light reflected by the polygon mirror 31 passes. The image forming lens 34 is fixed to the bottom wall part 42 of the housing 40 at a lateral side of the polygon mirror 31.

Between the plurality of light sources and the polygon mirror 31, optical elements such as a collimator lens and a cylindrical lens are provided, and laser beams D1 to D4 emitted from the light sources are converted into parallel light after passing through the collimator lens, and then are condensed to the polygon mirror 31 after passing through the cylindrical lens. The condensed laser beams D1 to D4 are reflected by the polygon mirror 31, pass through the image forming lens 34, and then are reflected by reflecting mirrors 35a to 35d disposed at optical paths of the laser beams D1 to D4, so that images of the laser beams D1 to D4 are formed on the surfaces of the photosensitive drums 25 corresponding to each color.

The scanning light, of which image has been formed on the surfaces of the photosensitive drums 25, scans the surfaces of the photosensitive drums 25 by the rotation of the polygon mirror 31 in a main scanning direction and scans the surfaces of the photosensitive drums 25 in a sub-scanning direction by the rotation of the photosensitive drums 25, thereby forming an electrostatic image on the surfaces of the photosensitive drums 25.

In the image forming apparatus 1, in order to satisfy a wide range of user demands, a high speed model and a low speed model having different processing speeds (the number of sheets printable per unit time) are set. Preferably, the same polygon motor is used for a high speed model (a model having a high processing speed) and a low speed model (a model having a low processing speed) in order to reduce cost. However, the maximum number of rotations of the polygon motor 32 is limited by a bearing structure and the like of the polygon motor 32. In this regard, the present embodiment prepares two types of a first deflector 301 (see FIG. 4) having a first polygon motor 321 for a low speed model and a second deflector 302 (see FIG. 5) having a second polygon motor 322 for a high speed model. Furthermore, any one of the two types can be selectively mounted at the housing 40 of the optical scanning device 15 according to the model of the image forming apparatus 1. In this way, the housing 40 is commonalized to reduce manufacturing cost. In the first deflector 301 and the second deflector 302, configurations of the polygon mirror 31 and the electric connector 36 are identical to each other, but configurations of the polygon motor 32 and the driving substrate 33 are different from each other. Hereinafter, with reference to FIG. 4 and FIG. 5, details of the first deflector 301 and the second deflector 302 will be described.

Figure 4:
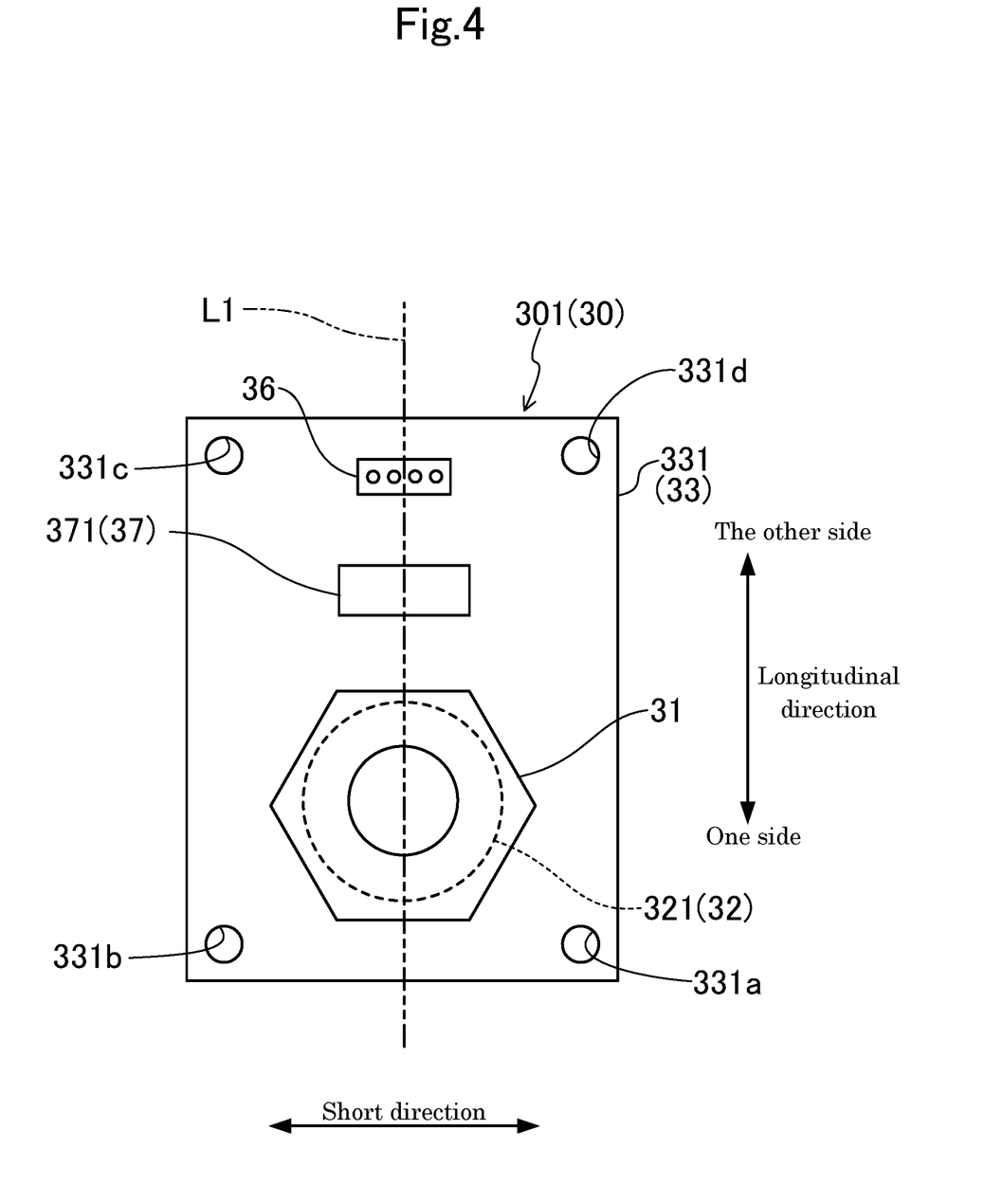
FIG. 4 is a plan view illustrating a first deflector mountable in a housing of an optical scanning device, which is viewed from a shaft center direction of a polygon motor.

As illustrated in FIG. 4, the first deflector 301 has the polygon mirror 31, the first polygon motor 321, and a first driving substrate 331 that supports the first polygon motor 321. The first polygon motor 321 is an electric motor having an oil dynamic pressure bearing.

The first driving substrate 331 has a rectangular plate shape, and the first polygon motor 321 is closer to one side than the center in the longitudinal direction of the first driving substrate 331 and is fixed to the center in the short direction. The electric connector 36 is fixed to the other end part in the longitudinal direction of the first driving substrate 331 and to the center in the short direction. Between the first polygon motor 321 and the electric connector 36, a first driving IC 371 is fixed to drive the first polygon motor 321. The first polygon motor 321, the first driving IC 371, and the electric connector 36 are disposed on a first straight line L1, which passes through a shaft center of the first polygon motor 321 and is parallel to one side in the longitudinal direction of the first driving substrate 331, when viewed from a shaft center direction of the first polygon motor 321.

The first driving substrate 331 are formed at the four corners thereof with mounting holes 331a to 331d. The first driving substrate 331 is fixed to the housing 40 by screws 60 inserted through these four mounting holes 331a to 331d.

Figure 5:
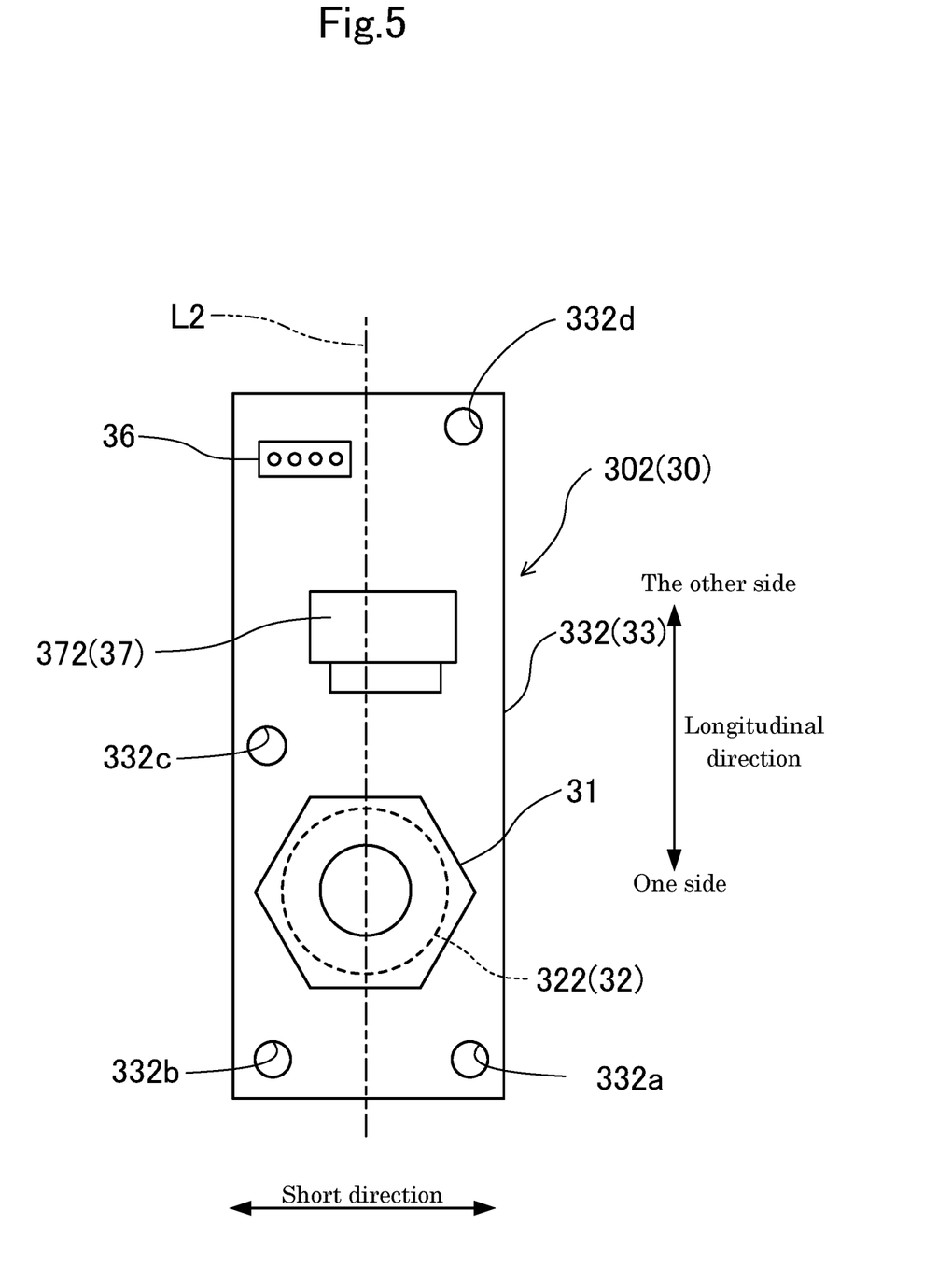
FIG. 5 is a plan view illustrating a second deflector mountable in a housing of an optical scanning device, which is viewed from a shaft center direction of a polygon motor.

As illustrated in FIG. 5, the second deflector 302 has the polygon mirror 31, the second polygon motor 322, and a second driving substrate 332 that supports the second polygon motor 322. The second polygon motor 322 is an electric motor having an air dynamic pressure bearing.

The second driving substrate 332 has a rectangular plate shape, and the second polygon motor 322 is closer to one side than the center in the longitudinal direction of the second driving substrate 332 and is fixed to the center in the short direction. The electric connector 36 is fixed to one of two corner parts of the other side in the longitudinal direction of the second driving substrate 332. A second driving IC 372 is fixed closer to the other side than the center in the longitudinal direction of the second driving substrate 332. The second driving IC 372 is disposed on a second straight line L2, which passes through a shaft center of the second polygon motor 322 and is parallel to one side in the longitudinal direction of the second driving substrate 332, when viewed from a shaft center direction of the second polygon motor 322.

The second driving substrate 332 is formed with at the peripheral edge parts thereof with mounting holes 332a to 332d. The arrangement configuration of the mounting holes 332a to 332d of the second driving substrate 332 is different from that of the mounting holes 331a to 331d of the first driving substrate 331. That is, the four mounting holes 332a to 332d are arranged such that a straight line connecting the centers of the mounting holes 332a to 332d has a trapezoidal shape when viewed from a shaft center direction of the second polygon motor 322. More specifically, the mounting hole 332a and the mounting hole 332b are formed at two corner parts of one side in the longitudinal direction of the second driving substrate 332, the mounting hole 332c is formed at one side end part in the short direction of the second driving substrate 332 and the center in the longitudinal direction thereof, and the mounting hole 332d is formed at one of the two corner parts of the other side in the longitudinal direction of the second driving substrate 332.

Figure 6:
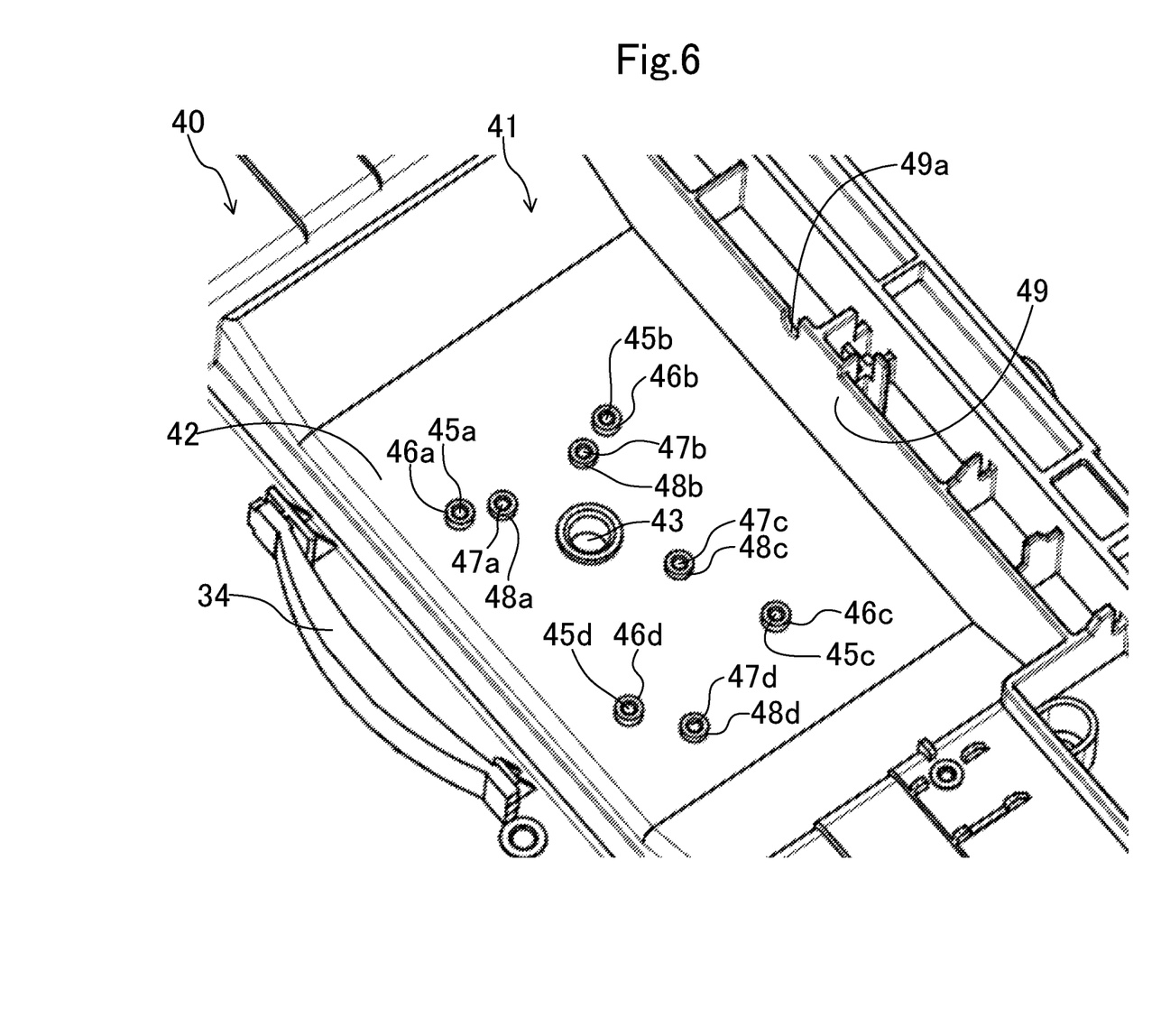
FIG. 6 is an enlarged perspective view illustrating a bottom wall part of a deflector receiving unit.

The bottom wall part 42 of the deflector receiving unit 41 of the housing 40 is configured such that the first driving substrate 331 and the second driving substrate 332 can be selectively mounted. Specifically, as illustrated in FIG. 6, the bottom wall part 42 of the deflector receiving unit 41 is formed with four first mounting target holes 45a to 45d through which the first driving substrate 331 is mounted and four second mounting target holes 47a to 47d through which the second driving substrate 332 is mounted. The first mounting target holes 45a to 45d and the second mounting target holes 47a to 47d are formed in first projecting bosses 46a to 46d and second projecting bosses 48a to 48d, which have a cylindrical shape, respectively. A reference numeral 43 of FIG. 6 is an opening in which the rotating shaft of the polygon motor 32 is rotatably received.

Figure 7:
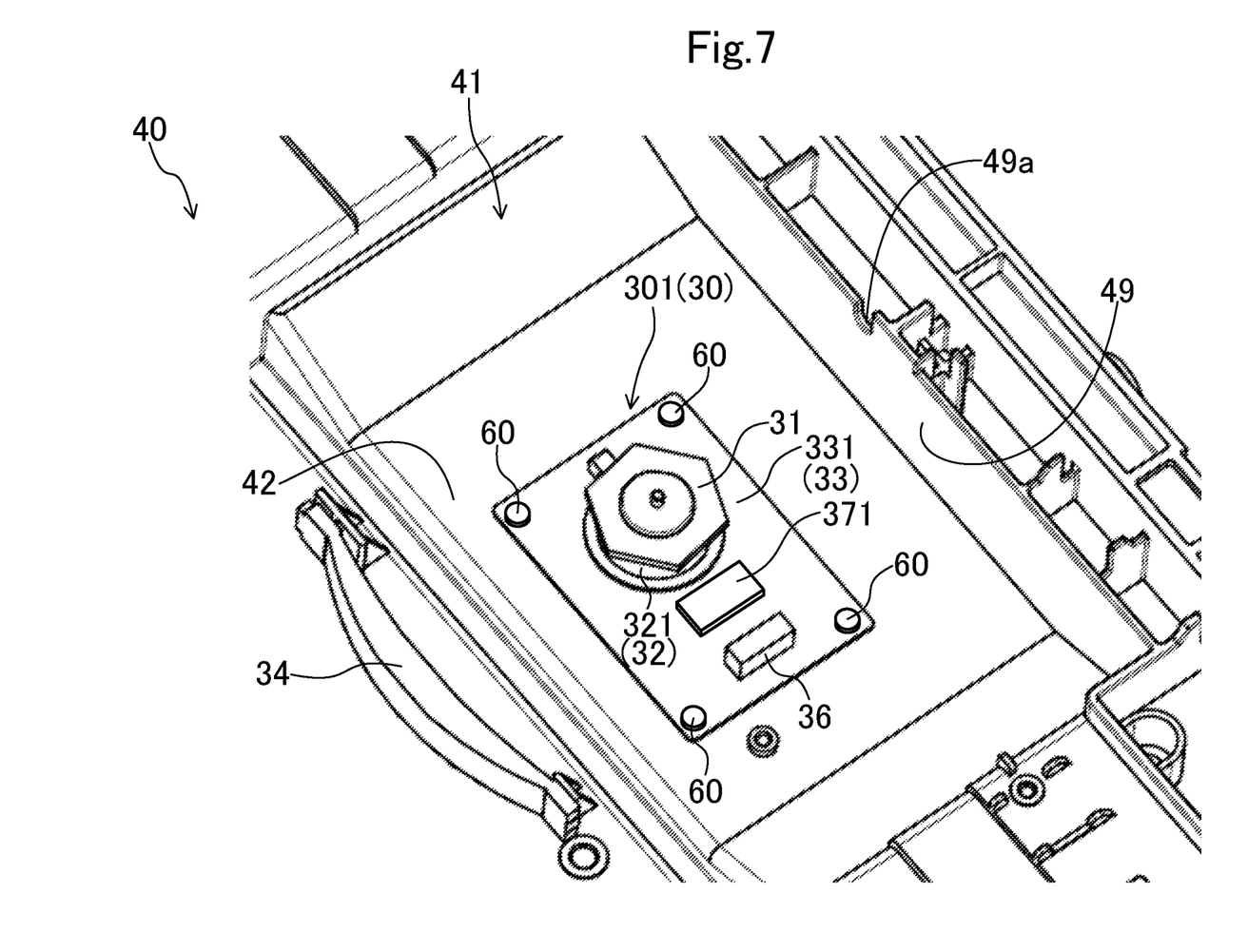
FIG. 7 is a perspective view illustrating a state in which a first deflector is mounted at a bottom wall part of a deflector receiving unit.
Figure 8:
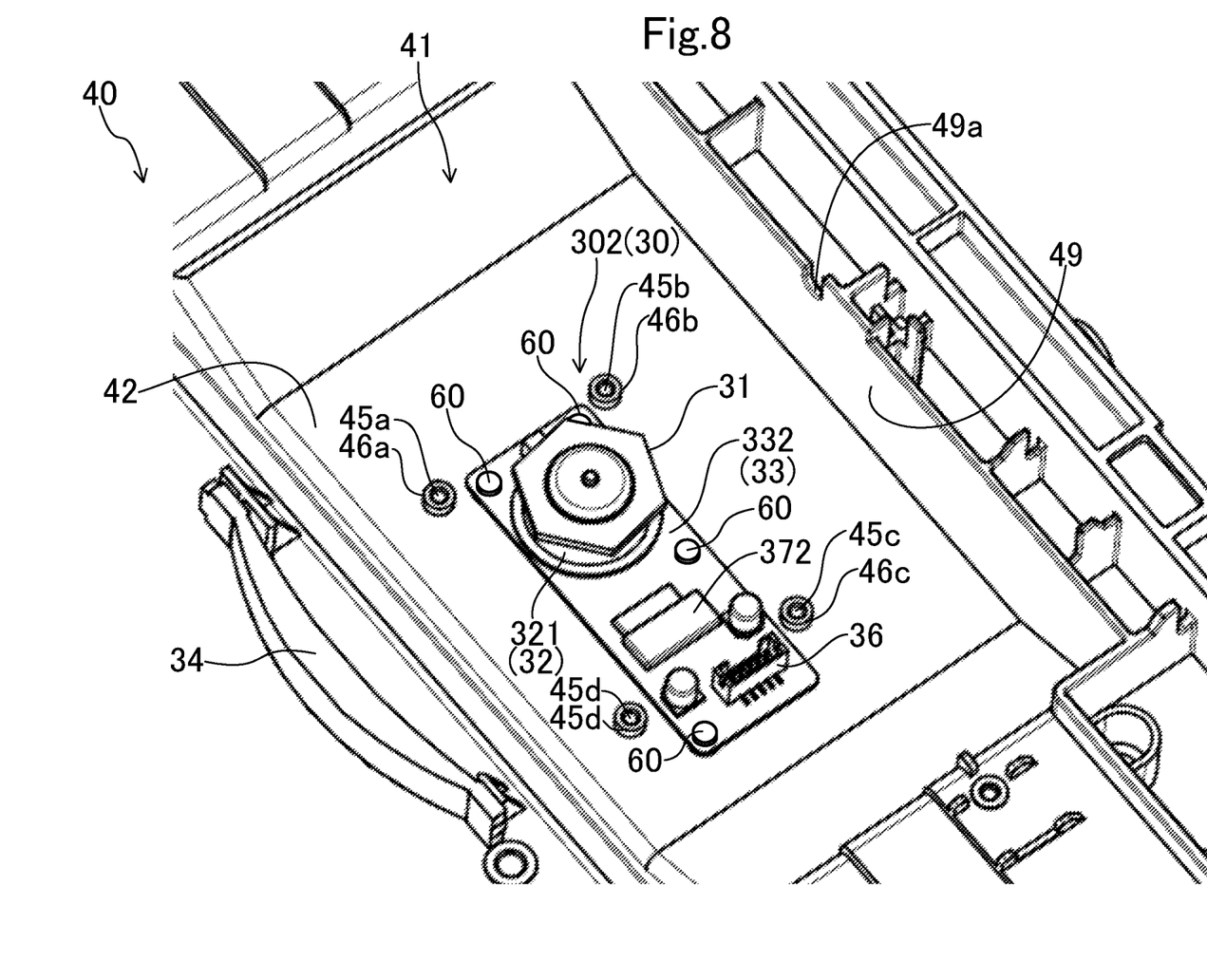
FIG. 8 is a perspective view illustrating a state in which a second deflector is mounted at a bottom wall part of a deflector receiving unit.

As illustrated in FIG. 7, the screws 60 are inserted through the four mounting holes 331a to 331d and are screwed with the first mounting target holes 45a to 45d, so that the first driving substrate 331 is fixed to the first projecting bosses 46a to 46d. As illustrated in FIG. 8, the screws 60 are inserted through the four mounting holes 332a to 332d and are screwed with the second mounting target holes 47a to 47d, so that the second driving substrate 332 is fixed to the second projecting bosses 48a to 48d.

Figure 9:
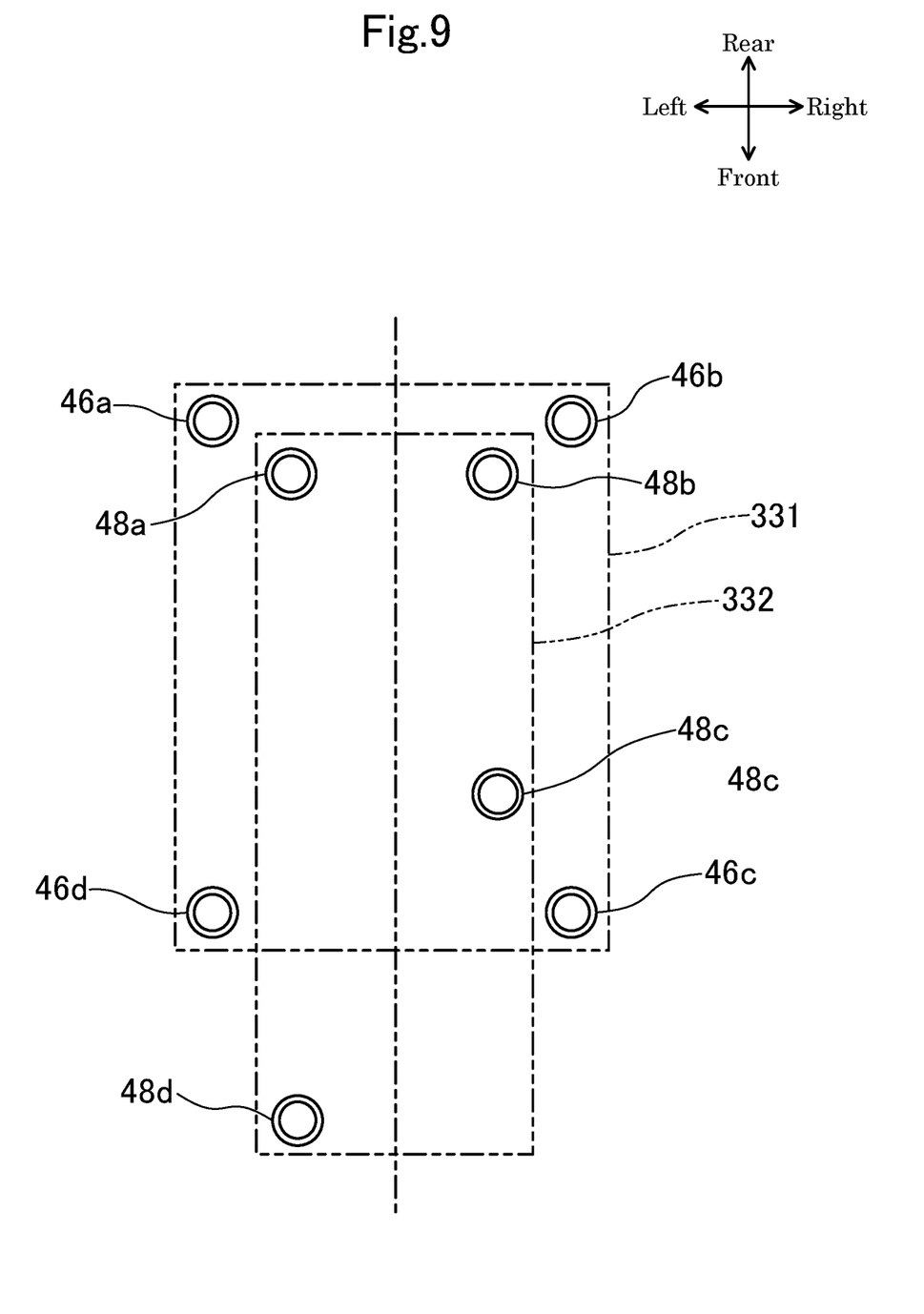
FIG. 9 is an explanation diagram for explaining an arrangement of first mounting target holes and second mounting target holes formed in a bottom wall part of a deflector receiving unit.

As illustrated in FIG. 9, the four first projecting bosses 46a to 46d are arranged spaced apart from one another in the front and rear direction and the right and left direction of the image forming apparatus 1 such that a straight line connecting the centers thereof forms a rectangle when viewed from a height direction (a projecting direction). The four second projecting bosses 48a to 48d are arranged inward from the four first projecting bosses 46a to 46d in the right and left direction (a predetermined direction) of the image forming apparatus 1. Three of the four second projecting bosses 48a to 48d are arranged inward from the four first projecting bosses 46a to 46d in the front and rear direction of the image forming apparatus 1, and the remaining one (the second projecting boss 48) is arranged outward from the four first projecting bosses 46a to 46d in the front and rear direction. As indicated by a two-dot chain line of FIG. 9, the second driving substrate 332 is formed so as not to overlap the first projecting bosses 46a to 46d when viewed from the projecting direction of the second projecting bosses 48a to 48d in the state of being fixed to the second projecting bosses 48a to 48d.

Figure 10:
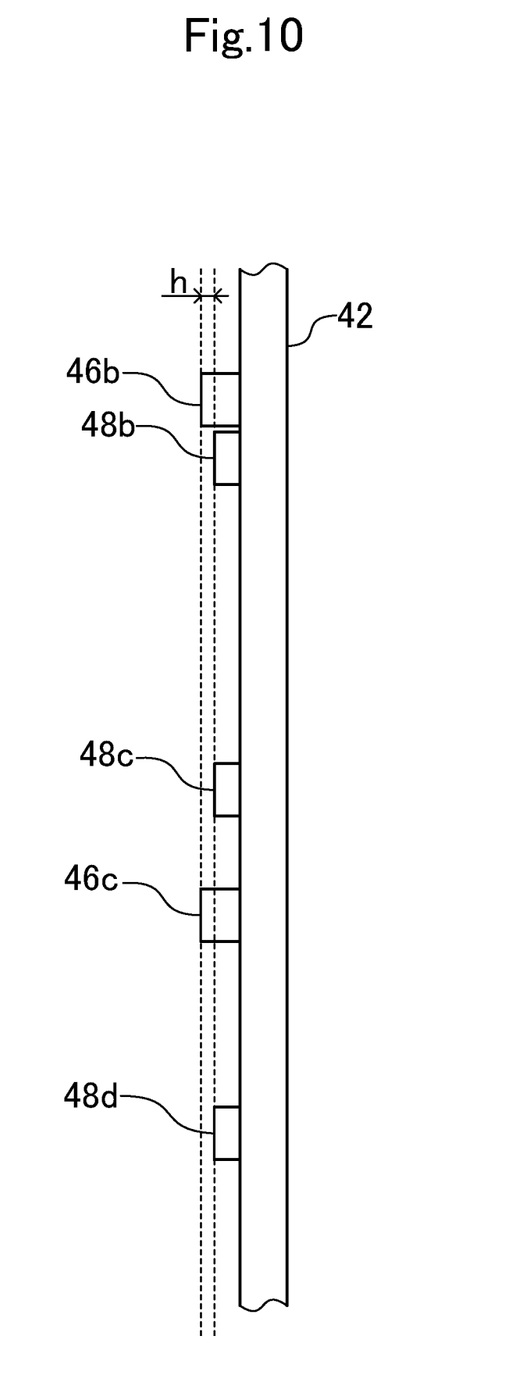
FIG. 10 is a schematic diagram when each projecting boss is viewed from a side.

As illustrated in FIG. 10, heights of the four first projecting bosses 46a to 46d are identical to one another and heights of the four second projecting bosses 48a to 48d are also identical to one another, but the heights of the four first projecting bosses 46a to 46d are different from those of the four second projecting bosses 48a to 48d. Specifically, the heights of the four second projecting bosses 48a to 48d are set to be lower than those of the four first projecting bosses 46a to 46d. When a setting value h of the difference between the heights are too small, since it is difficult to precisely manage the heights of the projecting bosses 46a to 46d and 48a to 48d, it is preferable that h is set to be less than 0.01 mm (h>0.01 mm), for example. On the other hand, when the difference h between the heights are too large, since laser beams from the light sources may not irradiate the reflecting surface of the polygon mirror 31, his set to be smaller than a thickness T (that is, a distance between a top surface and a bottom surface of the polygon mirror 31) of the polygon mirror 31. In the present embodiment, for example, it is set to be h<(T−0.4) mm, so that a distance from the top end surface or the bottom end surface of the polygon mirror 31 to an incident position of light is ensured by 0.2 mm or more.

As described above, in the aforementioned present embodiment, the aforementioned second projecting bosses 48a to 48d are arranged inward from the first projecting bosses 46a to 46d in the right and left direction, the aforementioned second driving substrate 332 is formed so as not to overlap the first projecting bosses 46a to 46d when viewed from the height direction of the second projecting bosses 48a to 48d in the state of being fixed to the second projecting bosses 48a to 48d, and the heights of the second projecting bosses 48a to 48d are set to be lower than those of the aforementioned first projecting bosses 46a to 46d.

Accordingly, when it is possible to perform height adjustment between the first projecting bosses 46a to 46d and height adjustment between the second projecting bosses 48a to 48d, it is possible to arrange each of the driving substrates 331 and 332 in parallel to the bottom wall part 42 of the housing 40 even without performing height adjustment of the first projecting bosses 46a to 46d and the second projecting bosses 48a to 48d. Consequently, it is possible to suppress molding accuracy required for the projecting bosses 46a to 46d and 48a to 48d to be low, so that it is possible to reduce the molding cost of the housing 40.

Other Embodiments

Figure 11:
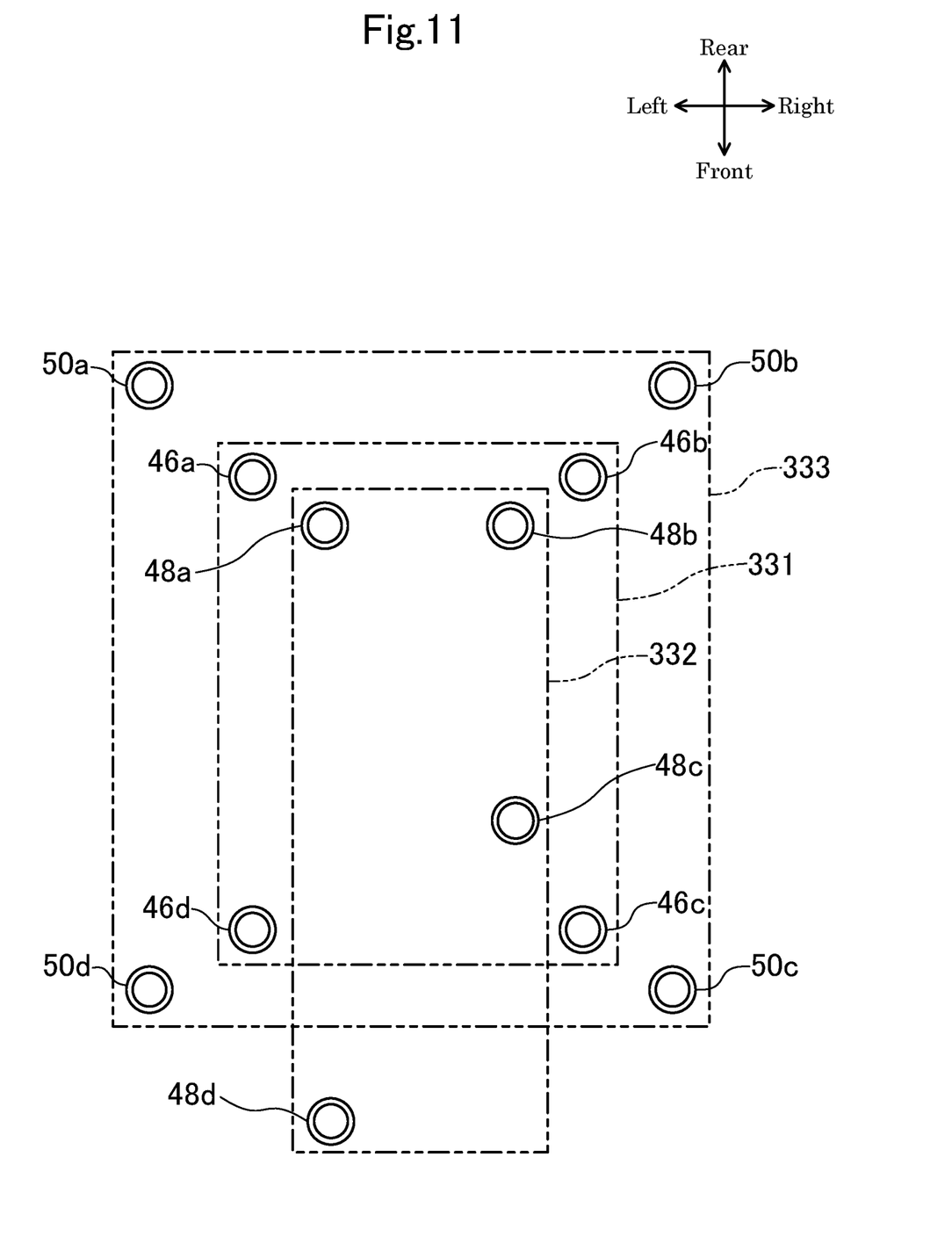
FIG. 11 is a diagram illustrating another embodiment, which corresponds to FIG. 9.
Figure 12:
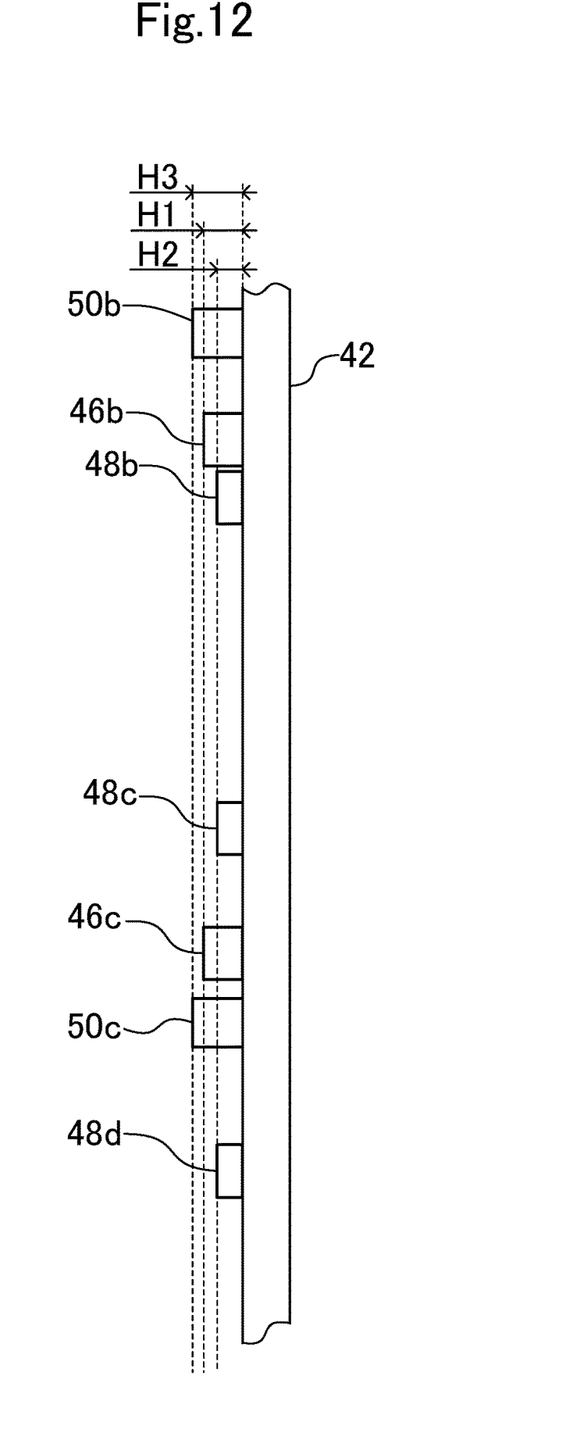
FIG. 12 is a diagram illustrating another embodiment, which corresponds to FIG. 10.

In the aforementioned present embodiment, the first projecting bosses 46a to 46d for fixing the first driving substrate 331 to the housing 40 and the second projecting bosses 48a to 48d for fixing the second driving substrate 332 are provided; however, the present invention is not limited thereto and for example, as illustrated in FIG. 11, third projecting bosses 50a to 50d for fixing a third driving substrate 333 may be further provided. The first projecting bosses 46a to 46d are arranged inward from the third projecting bosses 50a to 50d in the right and left direction, and the first driving substrate 331 is formed so as not to overlap the third projecting bosses 50a to 50d in the state of being fixed to the first projecting bosses 46a to 46d. When respective heights of the first projecting bosses 46a to 46d, the second projecting bosses 48a to 48d, and the third projecting bosses 50a to 50d are set as H1, H2, and H3, a relation of H1=(H2+H3)/2 is satisfied. When the first driving substrate 331 is fixed to the first projecting bosses 46a to 46d, the heights of the first projecting bosses 46a to 46d are set such that laser beams are incident to the center position in the height direction of the polygon mirror 31. It is preferable that H1−H2=H3−H1, it is further preferable that H3−H2<T (=T is a thickness of the reflecting mirror), and it is more preferable that H3−H2<(T−0.4) mm.

In the aforementioned present embodiment, an example, in which the image forming apparatus 1 is a color printer, has been described; however, the present invention is not limited thereto and for example, the image forming apparatus 1 may be a multifunctional peripheral, a facsimile and the like.

INDUSTRIAL APPLICABILITY

As described above, the present invention is useful for an optical scanning device and an image forming apparatus including the same.

The invention claimed is:

1. An optical scanning device comprising a housing having a mounting target wall part on which any one of a first substrate and a second substrate is selectively mountable, the first substrate having a plurality of mounting holes, the second substrate having positions of mounting holes different from positions of the mounting holes of the first substrate, first projecting bosses and second projecting bosses projecting from the mounting target wall part, the first projecting bosses having first mounting target holes provided at positions corresponding to the mounting holes of the first substrate, the second projecting bosses having second mounting target holes provided at positions corresponding to the mounting holes of the second substrate, wherein the second projecting bosses are arranged inward from the first projecting bosses in a predetermined direction, the second substrate is formed so as not to overlap the first projecting bosses when viewed from a height direction of the second projecting bosses in a state of being fixed to the second projecting bosses, and heights of the second projecting bosses are lower than heights of the first projecting bosses.

2. The optical scanning device of claim 1, wherein rotating polygon mirrors are respectively supported to the first substrate and the second substrate via polygon motors, and a difference between the heights of the first projecting bosses and the heights of the second projecting bosses is smaller than a thickness of the rotating polygon mirror.

3. An image forming apparatus comprising the optical scanning device of claim 1.

* * * * *